(12) United States Patent
Su

(10) Patent No.: US 11,876,478 B2
(45) Date of Patent: Jan. 16, 2024

(54) MOTOR CONTROLLER

(71) Applicant: Global Mixed-mode Technology Inc., Hsin-Chu (TW)

(72) Inventor: Chi-Hong Su, Hsinchu (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 183 days.

(21) Appl. No.: 17/374,967

(22) Filed: Jul. 13, 2021

(65) Prior Publication Data

US 2023/0016671 A1 Jan. 19, 2023

(51) Int. Cl.
*H02P 6/18* (2016.01)
*H02P 6/08* (2016.01)

(52) U.S. Cl.
CPC .............. *H02P 6/188* (2013.01); *H02P 6/08* (2013.01); *H02P 2209/07* (2013.01)

(58) Field of Classification Search
CPC ......... H02P 6/188; H02P 6/08; H02P 2209/07
USPC .................................................. 318/400.32
See application file for complete search history.

(56) References Cited

U.S. PATENT DOCUMENTS

| 8,310,188 | B2 | 11/2012 | Nakai | |
|---|---|---|---|---|
| 9,154,063 | B2 | 10/2015 | Inoue | |
| 10,644,629 | B2 | 5/2020 | Noie | |
| 2009/0102437 | A1* | 4/2009 | Nakagawa | H02P 9/48 |
| | | | | 323/217 |
| 2018/0083557 | A1* | 3/2018 | Kurosawa | H02P 6/157 |
| 2019/0067267 | A1 | 2/2019 | Shishikura | |
| 2021/0050806 | A1* | 2/2021 | Chen | H02P 6/21 |
| 2021/0091688 | A1* | 3/2021 | Chen | H02P 6/182 |

FOREIGN PATENT DOCUMENTS

TW 200423529 11/2004

OTHER PUBLICATIONS

AU 2013310606 A1 "Converter Control Device, Method And Program, And Air Conditioner", Date Published Feb. 19, 2015 Inv: Sumito (Year: 2015).*
JP 2004336876 A, "Three-Phase Voltage Type-Inverter Device and Method of Detecting Three-Phase AC Current Phase of Three-Phase Voltage-Type Inverter Device" Date Published Nov. 25, 2004, Inv: Yoshida Hidej (Year: 2004).*

* cited by examiner

Primary Examiner — Jorge L Carrasquillo
(74) Attorney, Agent, or Firm — Winston Hsu

(57) ABSTRACT

A motor controller comprises a switch circuit and a control unit. The switch circuit is coupled to a motor for driving the motor. The control unit is configured to generate a control signal to control the switch circuit. The motor controller is configured to generate a current signal and a voltage signal. When a current phase of the current signal is at a predetermined crossing phase, the motor controller calculates a difference value between the current phase of the current signal and a voltage phase of the voltage signal, where the motor controller is configured to control the difference value. The motor controller may stabilize the motor and avoid noise by modulating the difference value. The motor controller may modulate the difference value, such that the difference value is equal to a predetermined phase difference.

22 Claims, 4 Drawing Sheets

MOTOR CONTROLLER

BACKGROUND OF THE INVENTION

1. Field of the Invention

The present invention relates to a motor controller, and more particularly, to a motor controller which may be applied to a three-phase sensorless motor.

2. Description of the Prior Art

Conventionally, there are two driving methods for driving a motor. The first driving method uses the Hall sensor for switching phases, so as to drive the motor. The second driving method does not use the Hall sensor to drive the motor. The Hall sensor is affected by the external environment easily, such that the detecting accuracy is decreased. Besides, the installation of the Hall sensor results in an increase of the volume and the cost of the system. Therefore, the sensorless driving method is provided for solving the above problems.

In the sensorless driving method, the motor controller may compare the voltage of the floating phase with a reference voltage, so as to detect the back electromotive force (BEMF) of the floating phase for switching phases. However, when the motor controller starts the floating phase to detect a phase switching time point, it results in the discontinuity of the output voltage, thereby generating noise.

The other prior-art method utilizes the following equation for estimating the back electromotive force:

$$V = I \times Rm + L \times di/dt + BEMF$$

Rm is the motor resistance and L is the coil inductance. However, this prior-art method needs a complex computing circuit to estimate the back electromotive force. Thus, a new technology is needed to drive the motor and avoid noise by using a simple computing circuit.

SUMMARY OF THE INVENTION

According to the present invention, a motor controller which is capable of utilizing a simple computing circuit to drive a motor and avoid noise is provided. The motor controller is used for driving the motor, where the motor may be a three-phase motor. The motor controller comprises a switch circuit, a control unit, a current detecting unit, a waveform processing unit, and a phase difference processing unit. The switch circuit may include a first transistor, a second transistor, a third transistor, a fourth transistor, a fifth transistor, a sixth transistor, a first terminal, a second terminal, and a third terminal, where the switch circuit is coupled to the motor for driving the motor. The first terminal has a current signal Iu and a voltage signal Vu for driving the motor. Each of the first transistor, the third transistor, and the fifth transistor is an upper-side switch. Each of the second transistor, the fourth transistor, and the sixth transistor is a lower-side switch. The control unit generates a control signal to control the switch circuit.

The current detecting unit is coupled to the switch circuit and the control unit for detecting a current phase. The current detecting unit is coupled to the first terminal, the second terminal, and the third terminal. The current detecting unit comprises a first comparator, a second comparator, a multiplexer, a first switch, a second switch, a third switch, and a resistor. The current detecting unit may have three detecting methods. For example, the first detecting method may detect the current signal Iu to obtain the current phase. The designer may also detect the current flowing from the second terminal to the motor or the current flowing from the third terminal to the motor to obtain the current phase. The second detecting method may detect the current flowing through the resistor to obtain the current phase. The first switch is coupled to the first terminal, the first comparator, and the second comparator. The first comparator is coupled to one terminal of the first transistor and the first switch, so as to detect the voltage difference between the source of the first transistor and the drain of the first transistor for obtaining the current phase. The second comparator is coupled to one terminal of the second transistor and the first switch, so as to detect the voltage difference between the source of the second transistor and the drain of the second transistor for obtaining the current phase. The second switch is coupled to the second terminal, the first comparator, and the second comparator. The first comparator is coupled to one terminal of the third transistor and the second switch, so as to detect the voltage difference between the source of the third transistor and the drain of the third transistor for obtaining the current phase. The second comparator is coupled to one terminal of the fourth transistor and the second switch, so as to detect the voltage difference between the source of the fourth transistor and the drain of the fourth transistor for obtaining the current phase. The third switch is coupled to the third terminal, the first comparator, and the second comparator. The first comparator is coupled to one terminal of the fifth transistor and the third switch, so as to detect the voltage difference between the source of the fifth transistor and the drain of the fifth transistor for obtaining the current phase. The second comparator is coupled to one terminal of the sixth transistor and the third switch, so as to detect the voltage difference between the source of the sixth transistor and the drain of the sixth transistor for obtaining the current phase. The multiplexer is coupled to one output terminal of the first comparator and one output terminal of the second comparator for generating a detecting signal. The multiplexer may output phase information of an upper-side switch or phase information of a lower-side switch based on a selecting signal, thereby implementing the third detecting method. Furthermore, the current detecting unit is coupled to the switch circuit, so as to generate a phase signal to the phase difference processing unit, where the phase signal represents a current phase.

The waveform processing unit may enable that the motor controller is in a trapezoidal wave driving mode or a sine wave driving mode. The waveform processing unit may determine whether the motor controller is in a trapezoidal wave driving mode or a sine wave driving mode based on speed information. Moreover, the waveform processing unit generates a pulse width modulation signal to the control unit, where the pulse width modulation signal has a duty cycle. The motor controller may adjust the speed of the motor based on the duty cycle.

Each of the current signal Iu and the voltage signal Vu may be a sine wave signal. When the current phase of the current signal Iu is at a predetermined crossing phase, the motor controller calculates the difference value D between the current phase of the current signal Iu and the voltage phase of the voltage signal Vu, where the motor controller is configured to control the difference value D. More specifically, the motor controller may stabilize the motor and avoid noise by modulating the difference value D. For example, when the difference value D is greater than a predetermined phase difference, the motor controller decreases the difference value D gradually, thereby enabling that the difference value D is equal to the predetermined phase difference. When the difference value D is less than the predetermined phase difference, the motor controller increases the difference value D gradually, thereby enabling that the difference value D is equal to the predetermined phase difference. When the difference value D is equal to the predetermined phase difference, the motor is in a stable state. The difference value D may be controlled by a phase lock loop controller, a digital phase lock loop controller, a proportional-integral controller, a proportional-derivative controller, or a proportional-integral-derivative controller. For example, the motor controller may utilize the current phase of the current signal Iu to modulate the voltage phase of the voltage signal Vu. The motor controller may modulate the difference value D by adjusting the electric period of the voltage signal Vu. When the difference value D is greater than the predetermined phase difference, the motor controller decreases the electric period of the voltage signal Vu. When the difference value D is less than the predetermined phase difference, the motor controller increases the electric period of the voltage signal Vu. Therefore, the motor controller may know when to switch phases by modulating the electric period of the voltage signal Vu. That is to say, the motor controller 10 may achieve a phase switching function without detecting a phase switching time point.

According to one embodiment of the present invention, the motor controller may execute steps S41-S44 of a flow chart to drive the motor smoothly. Firstly, the motor controller detects the current phase of the current signal Iu (Step S41). Then the motor controller checks whether the current phase of the current signal Iu is at a predetermined crossing phase or not (Step S42). The predetermined crossing phase may be 0 degrees, 60 degrees, 120 degrees, 180 degrees, 240 degrees, or 300 degrees. The designer may select six predetermined crossing phases, three predetermined crossing phases, two predetermined crossing phases, or one predetermined crossing phase according to the needed bandwidth. That is to say, the motor controller may utilize a plurality of predetermined crossing phases to drive the motor. For example, when the designer selects six predetermined crossing phases, the bandwidth is maximized and thus the motor controller is capable of stabilizing the motor quickly. When the designer selects one predetermined crossing phase, the bandwidth is minimized and thus the motor controller needs a long time to stabilize the motor. When the current phase of the current signal Iu is at the predetermined crossing phase, the motor controller calculates the difference value D between the current phase of the current signal Iu and the voltage phase of the voltage signal Vu (Step S43). When the current phase of the current signal Iu is not at the predetermined crossing phase, the motor controller keeps detecting the current phase of the current signal Iu (Step S41). The phase difference processing unit may be used to calculate the difference value D between the current phase of the current signal Iu and the voltage phase of the voltage signal Vu. Then the motor controller enables the difference value D to be equal to a predetermined phase difference (Step S44). At last the motor controller keeps detecting the current phase of the current signal Iu (Step S41). The phase difference processing unit may be used to modulate the difference value D, such that the difference value D is equal to the predetermined phase difference. The phase difference processing unit receives the phase signal, so as to generate a time signal to the waveform processing unit, where the time signal may represent an electric period time. Based on information of the time signal, the waveform processing unit may modulate the electric period of the voltage signal Vu to know when to switch phases. Thus, the motor controller is needless to start a floating phase for detecting a phase switching time point, thereby avoid noise. Moreover, the motor controller may utilize a simple computing circuit to drive the motor.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
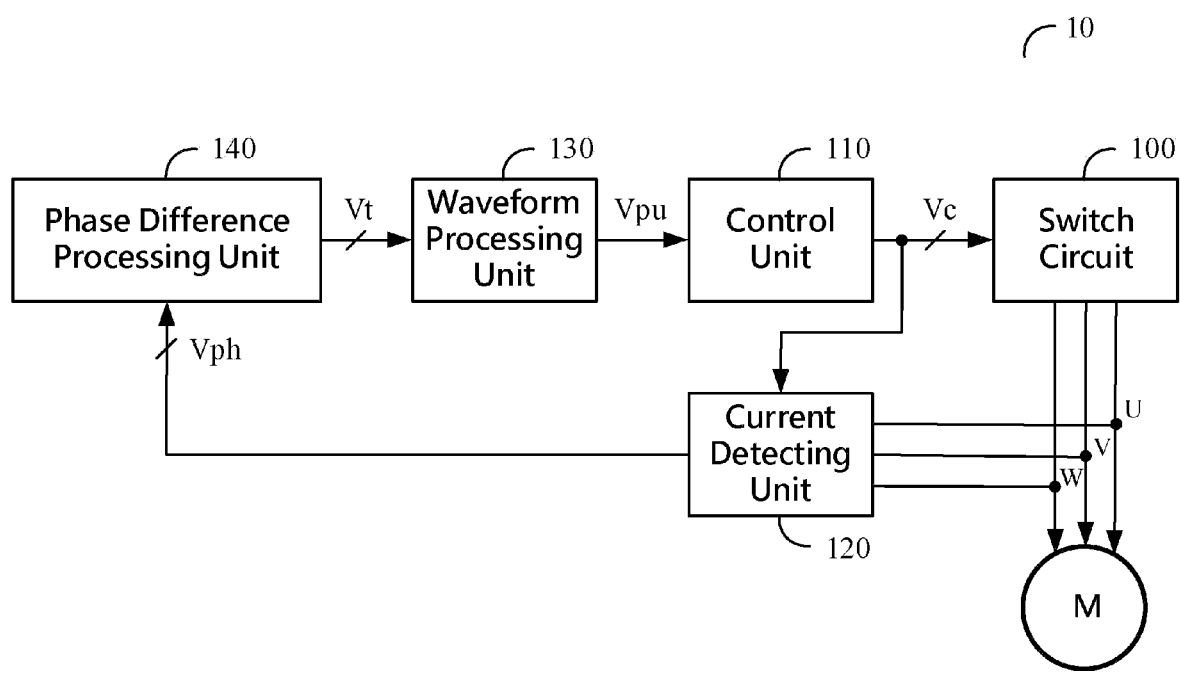
FIG. 1 is a schematic diagram showing a motor controller according to one embodiment of the present invention.
Figure 2:
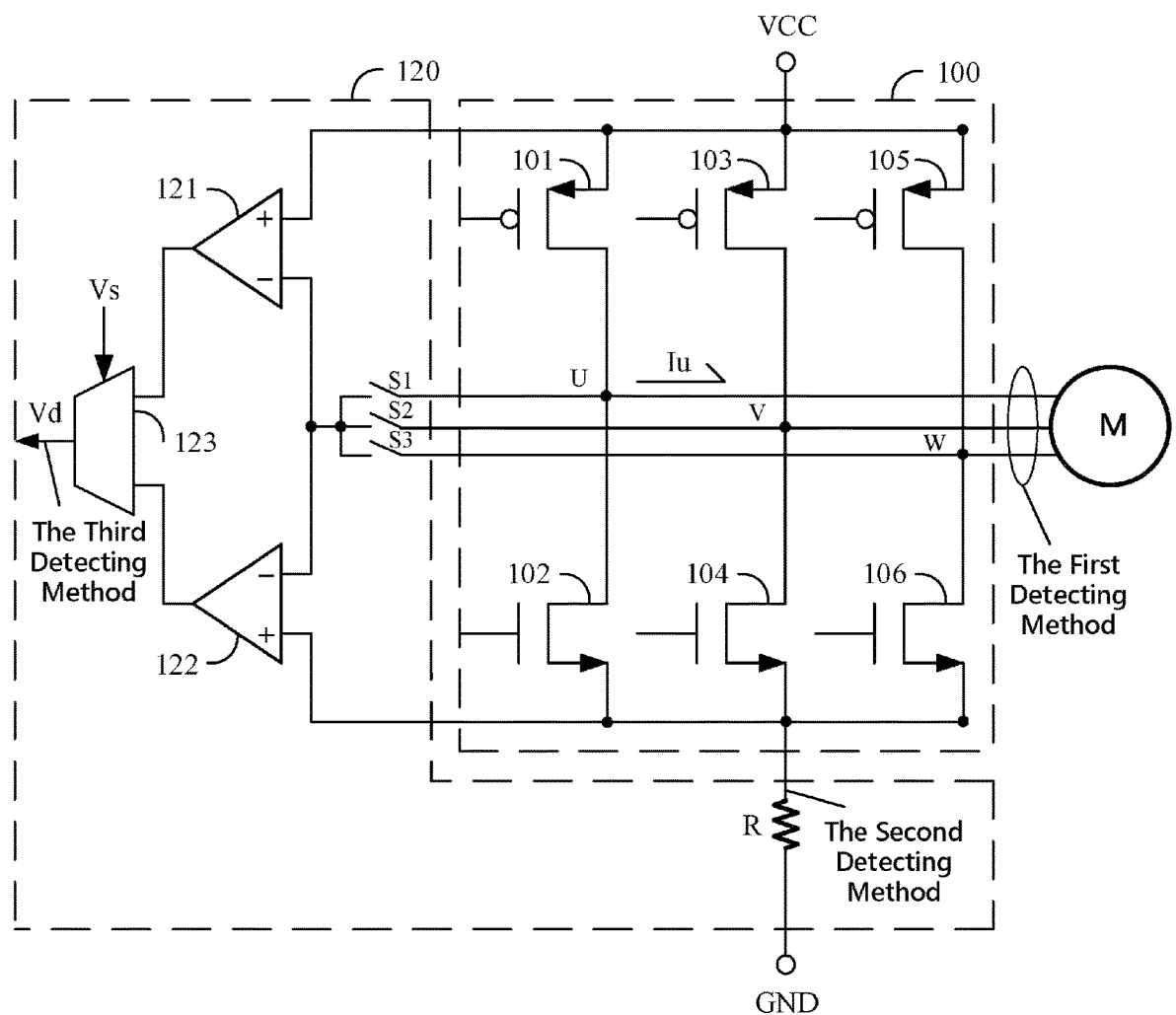
FIG. 2 is a schematic diagram showing a switch circuit and a current detecting unit according to one embodiment of the present invention.

FIG. 1 is a schematic diagram showing a motor controller 10 according to one embodiment of the present invention. The motor controller 10 is used for driving a motor M, where the motor M may be a three-phase motor. The motor controller 10 comprises a switch circuit 100, a control unit 110, a current detecting unit 120, a waveform processing unit 130, and a phase difference processing unit 140. FIG. 2 is a schematic diagram showing the switch circuit 100 and the current detecting unit 120 according to one embodiment of the present invention. As shown in FIG. 2, the switch circuit 100 may include a first transistor 101, a second transistor 102, a third transistor 103, a fourth transistor 104, a fifth transistor 105, a sixth transistor 106, a first terminal U, a second terminal V, and a third terminal W, where the switch circuit 100 is coupled to the motor M for driving the motor M. The first terminal U has a current signal Iu and a voltage signal Vu for driving the motor M. The first transistor 101 is coupled to a fourth terminal VCC and the first terminal U while the second transistor 102 is coupled to the first terminal U and a resistor R. The third transistor 103 is coupled to the fourth terminal VCC and the second terminal V while the fourth transistor 104 is coupled to the second terminal V and the resistor R. The fifth transistor 105 is coupled to the fourth terminal VCC and the third terminal W while the sixth transistor 106 is coupled to the third terminal Wand the resistor R. One terminal of the resistor R is coupled to the second transistor 102, the fourth transistor 104, and the sixth transistor 106. Another terminal of the resistor R is coupled to a fifth terminal GND. Each of the first transistor 101, the third transistor 103, and the fifth transistor 105 may be a p-type MOSFET. Each of the second transistor 102, the fourth transistor 104, and the sixth transistor 106 may be an n-type MOSFET. Moreover, each of the first transistor 101, the third transistor 103, and the fifth transistor 105 is an upper-side switch. Each of the second transistor 102, the fourth transistor 104, and the sixth transistor 106 is a lower-side switch. The control unit 110 generates a control signal Vc to control the switch circuit 100. That is to say, the control unit 110 may be configured to respectively control the ON/OFF states of the first transistor 101, the second transistor 102, the third transistor 103, the fourth transistor 104, the fifth transistor 105, and the sixth transistor 106.

The current detecting unit 120 is coupled to the switch circuit 100 and the control unit 110 for detecting a current phase. As shown in FIG. 1 or FIG. 2, the current detecting unit 120 is coupled to the first terminal U, the second terminal V, and the third terminal W. The current detecting unit 120 comprises a first comparator 121, a second comparator 122, a multiplexer 123, a first switch S1, a second switch S2, a third switch S3, and the resistor R. The current detecting unit 120 may have three detecting methods. For example, the first detecting method may detect the current signal Iu to obtain the current phase. The designer may also detect the current flowing from the second terminal V to the motor M or the current flowing from the third terminal W to the motor M to obtain the current phase. The second detecting method may detect the current flowing through the resistor R to obtain the current phase. The first switch S1 is coupled to the first terminal U, the first comparator 121, and the second comparator 122. The first comparator 121 is coupled to one terminal of the first transistor 101 and the first switch S1, so as to detect the voltage difference between the source of the first transistor 101 and the drain of the first transistor 101 for obtaining the current phase. The second comparator 122 is coupled to one terminal of the second transistor 102 and the first switch S1, so as to detect the voltage difference between the source of the second transistor 102 and the drain of the second transistor 102 for obtaining the current phase. The second switch S2 is coupled to the second terminal V, the first comparator 121, and the second comparator 122. The first comparator 121 is coupled to one terminal of the third transistor 103 and the second switch S2, so as to detect the voltage difference between the source of the third transistor 103 and the drain of the third transistor 103 for obtaining the current phase. The second comparator 122 is coupled to one terminal of the fourth transistor 104 and the second switch S2, so as to detect the voltage difference between the source of the fourth transistor 104 and the drain of the fourth transistor 104 for obtaining the current phase. The third switch S3 is coupled to the third terminal W, the first comparator 121, and the second comparator 122. The first comparator 121 is coupled to one terminal of the fifth transistor 105 and the third switch S3, so as to detect the voltage difference between the source of the fifth transistor 105 and the drain of the fifth transistor 105 for obtaining the current phase. The second comparator 122 is coupled to one terminal of the sixth transistor 106 and the third switch S3, so as to detect the voltage difference between the source of the sixth transistor 106 and the drain of the sixth transistor 106 for obtaining the current phase. The multiplexer 123 is coupled to one output terminal of the first comparator 121 and one output terminal of the second comparator 122 for generating a detecting signal Vd. The multiplexer 123 may output phase information of an upper-side switch or phase information of a lower-side switch based on a selecting signal Vs, thereby implementing the third detecting method. The designer may implement the three detecting methods, two of the three detecting methods, or one of the three detecting methods according to the practical need. Furthermore, the current detecting unit 120 is coupled to the switch circuit 100, so as to generate a phase signal Vph to the phase difference processing unit 140, where the phase signal Vph represents a current phase.

The waveform processing unit 130 enables that the motor controller 10 is in a trapezoidal wave driving mode or a sine wave driving mode. The waveform processing unit 130 may determine whether the motor controller 10 is in a trapezoidal wave driving mode or a sine wave driving mode based on speed information. Moreover, the waveform processing unit 130 generates a pulse width modulation signal Vpu to the control unit 110, where the pulse width modulation signal Vpu has a duty cycle. The motor controller 10 may adjust the speed of the motor M based on the duty cycle.

Figure 3:
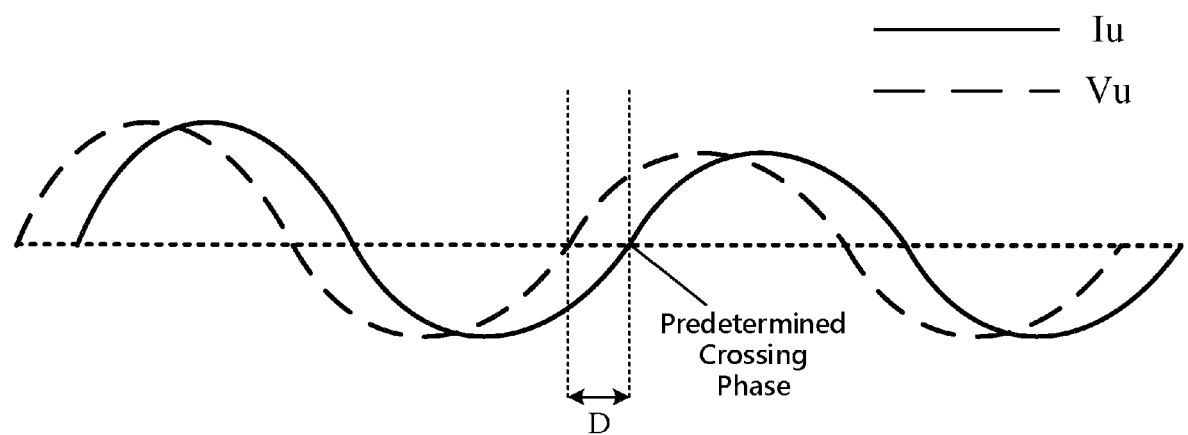
FIG. 3 is a timing chart according to one embodiment of the present invention.

FIG. 3 is a timing chart according to one embodiment of the present invention, where each of the current signal Iu and the voltage signal Vu is a sine wave signal. When the current phase of the current signal Iu is at a predetermined crossing phase, the motor controller 10 calculates the difference value D between the current phase of the current signal Iu and the voltage phase of the voltage signal Vu, where the motor controller 10 is configured to control the difference value D. More specifically, the motor controller 10 may stabilize the motor M and avoid noise by modulating the difference value D. For example, when the difference value D is greater than a predetermined phase difference, the motor controller 10 decreases the difference value D gradually, thereby enabling that the difference value D is equal to the predetermined phase difference. When the difference value D is less than the predetermined phase difference, the motor controller 10 increases the difference value D gradually, thereby enabling that the difference value D is equal to the predetermined phase difference. When the difference value D is equal to the predetermined phase difference, the motor M is in a stable state. The difference value D may be controlled by a phase lock loop controller, a digital phase lock loop controller, a proportional-integral controller, a proportional-derivative controller, or a proportional-integral-derivative controller. The designer may implement one of the above controllers for modulating the difference value D. For example, the motor controller 10 may utilize the current phase of the current signal Iu to modulate the voltage phase of the voltage signal Vu. The motor controller 10 may modulate the difference value D by adjusting the electric period of the voltage signal Vu. The design may also modulate the difference value D by adjusting the other parameter. When the difference value D is greater than the predetermined phase difference, the motor controller 10 decreases the electric period of the voltage signal Vu. When the difference value D is less than the predetermined phase difference, the motor controller 10 increases the electric period of the voltage signal Vu. Therefore, the motor controller 10 may know when to switch phases by modulating the electric period of the voltage signal Vu. That is to say, the motor controller 10 may achieve a phase switching function without detecting a phase switching time point. Moreover, the predetermined phase difference is related to the speed of the motor M. In general, when the speed of the motor M increases, the predetermined phase difference decreases. The motor controller 10 may utilize a look-up table to store the relationship between the predetermined phase difference and the speed of the motor M. Based on the above disclosure, the motor controller 10 is needless to start the floating phase, thereby avoiding noise. In other words, the motor controller 10 is needless to detect a back electromotive force and the voltage signal Vu may be irrelevant to the back electromotive force. Thus, the technology used in the present invention may be irrelevant to the back electromotive force. The motor controller 10 may use a simple computing circuit to drive the motor M.

Figure 4:
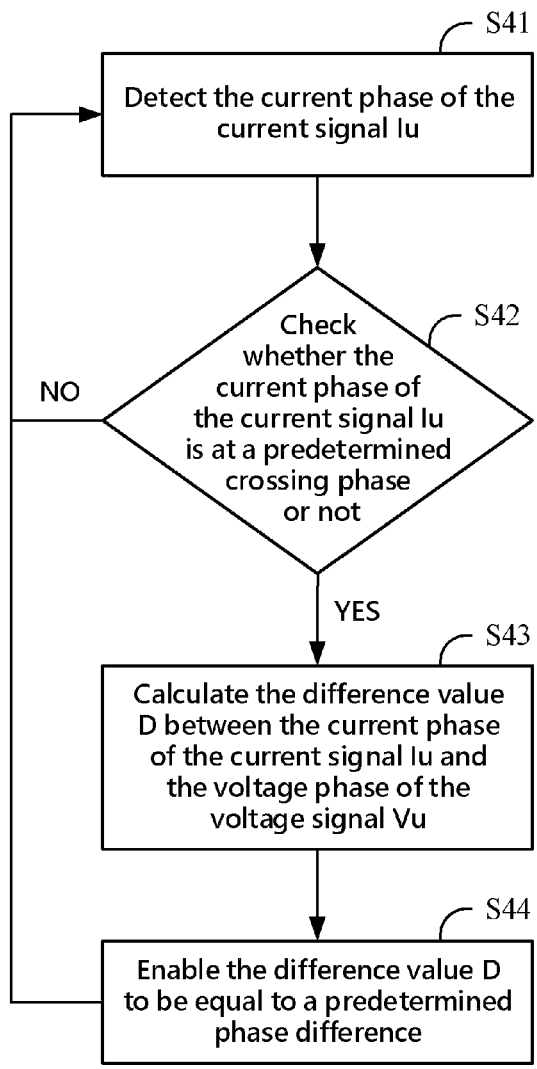
FIG. 4 is a flow chart according to one embodiment of the present invention.

FIG. 4 is a flow chart according to one embodiment of the present invention. Firstly, the motor controller 10 detects the current phase of the current signal Iu (Step S41). Then the motor controller 10 checks whether the current phase of the current signal Iu is at a predetermined crossing phase or not (Step S42). The predetermined crossing phase may be 0 degrees, 60 degrees, 120 degrees, 180 degrees, 240 degrees, or 300 degrees. The designer may select six predetermined crossing phases, three predetermined crossing phases, two predetermined crossing phases, or one predetermined crossing phase according to the needed bandwidth. That is to say, the motor controller 10 may utilize a plurality of predetermined crossing phases to drive the motor M. For example, when the designer selects six predetermined crossing phases, the bandwidth is maximized and thus the motor controller 10 is capable of stabilizing the motor M quickly. When the designer selects one predetermined crossing phase, the bandwidth is minimized and thus the motor controller 10 needs a long time to stabilize the motor M. When the current phase of the current signal Iu is at the predetermined crossing phase, the motor controller 10 calculates the difference value D between the current phase of the current signal Iu and the voltage phase of the voltage signal Vu (Step S43). When the current phase of the current signal Iu is not at the predetermined crossing phase, the motor controller 10 keeps detecting the current phase of the current signal Iu (Step S41). The phase difference processing unit 140 may be used to calculate the difference value D between the current phase of the current signal Iu and the voltage phase of the voltage signal Vu. Then the motor controller 10 enables the difference value D to be equal to a predetermined phase difference (Step S44). At last the motor controller 10 keeps detecting the current phase of the current signal Iu (Step S41). The phase difference processing unit 140 may be used to modulate the difference value D, such that the difference value D is equal to the predetermined phase difference. That is to say, the phase difference processing unit 140 may comprise the phase lock loop controller, the digital phase lock loop controller, the proportional-integral controller, the proportional-derivative controller, or the proportional-integral-derivative controller to control the difference value D. Furthermore, the phase difference processing unit 140 may comprise the look-up table to store the relationship between the predetermined phase difference and the speed of the motor M. The phase difference processing unit 140 receives the phase signal Vph, so as to generate a time signal Vt to the waveform processing unit 130, where the time signal Vt may represent an electric period time. Based on information of the time signal Vt, the waveform processing unit 130 may modulate the electric period of the voltage signal Vu to know when to switch phases. More specifically, when the speed of the motor M changes, the motor controller 10 will execute steps S41-S44 once again for driving the motor M smoothly.

According to one embodiment of the present invention, the motor controller 10 may be applied to a sensorless motor. Moreover, the motor controller 10 may also be applied to a single-phase motor, a polyphase motor, a brushless motor, or a DC motor. To sum up, when the current phase of the current signal Iu is at a predetermined crossing phase, the motor controller 10 calculates the difference value D between the current phase of the current signal Iu and the voltage phase of the voltage signal Vu. The motor controller 10 modulates the difference value D, such that the difference value D is equal to a predetermined phase difference. The motor controller 10 may achieve a phase switching function without starting a floating phase. Also, the motor controller 10 may achieve a phase switching function without detecting a back electromotive force. Thus, the motor controller 10 may utilize a simple computing circuit to drive the motor M and avoid noise.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller comprising:
   a switch circuit, coupled to a motor for driving the motor; and
   a control unit, configured to generate a control signal to control the switch circuit,
      wherein the motor controller is configured to generate a current signal and a voltage signal, when a current phase of the current signal is at a predetermined crossing phase, the motor controller calculates a difference value between the current phase of the current signal and a voltage phase of the voltage signal, the motor controller is configured to control the difference value for switching phases, such that the motor controller achieves a phase switching function detecting a back electromotive force of a floating phase, and the motor controller drives the motor without utilizing a Hall sensor in all modes of operation,
      wherein the motor controller modulates the difference value, such that the difference value is equal to a predetermined phase difference,
      wherein the predetermined phase difference is related to a speed of the motor, and
      wherein when the speed of the motor increases, the predetermined phase difference decreases.

2. The motor controller of claim 1, wherein the difference value is controlled by a phase lock loop controller.

3. The motor controller of claim 1, wherein the motor controller modulates the difference value by adjusting an electric period of the voltage signal.

4. The motor controller of claim 3, wherein when the difference value is greater than a predetermined phase difference, the motor controller decreases the electric period of the voltage signal.

5. The motor controller of claim 3, wherein when the difference value is less than a predetermined phase difference, the motor controller increases the electric period of the voltage signal.

6. The motor controller of claim 1, wherein the predetermined crossing phase is 0 degrees, 60 degrees, 120 degrees, 180 degrees, 210 degrees, or 300 degrees.

7. The motor controller of claim 1, wherein the motor controller stabilizes the motor by modulating the difference value.

8. The motor controller of claim 1, wherein the motor controller avoids noise by modulating the difference value.

9. The motor controller of claim 1, wherein the motor controller further comprises a current detecting unit, the current detecting unit comprises a resistor, and the resistor is coupled to the switch circuit.

10. The motor controller of claim 1, wherein the motor controller further comprises a current detecting unit, the current detecting unit comprises a first switch, and the first switch is coupled to the switch circuit.

11. The motor controller of claim 10, wherein the current detecting unit further comprises a first comparator, and the first comparator is coupled to the first switch.

12. The motor controller of claim 10, wherein the current detecting unit further comprises a second switch, and the second switch is coupled to the switch circuit.

13. The motor controller of claim 1, wherein the motor controller further comprises:
a phase difference processing unit; and a current detecting unit, coupled to the switch circuit for generating a phase signal to the phase difference processing unit.

14. The motor controller of claim 13, wherein the phase difference processing unit comprises a phase lock loop controller to control the difference value.

15. The motor controller of claim 13, wherein the motor controller further comprises a waveform processing unit, and the phase difference processing unit receives the phase signal, so as to generate a time signal to the waveform processing unit.

16. The motor controller of claim 15, wherein the waveform processing unit enables that the motor controller is in a trapezoidal wave driving mode or a sine wave driving mode.

17. The motor controller of claim 16, wherein the waveform processing unit determines whether the motor controller is in a trapezoidal wave driving mode or a sine wave driving mode based on speed information.

18. The motor controller of claim 15, wherein the waveform processing unit generates a pulse width modulation signal to the control unit, the pulse width modulation signal has a duty cycle, and the motor controller adjusts a speed of the motor based on the duty cycle.

19. The motor controller of claim 1, wherein the voltage signal is irrelevant to the back electromotive force.

20. The motor controller of claim 1, wherein the motor controller utilizes a plurality of predetermined crossing phases to drive the motor.

21. The motor controller of claim 1, wherein the motor controller is applied to a sensorless motor.

22. The motor controller of claim 1, wherein the motor controller is applied to a single-phase motor, a polyphase motor, a brushless motor, or a DC motor.

* * * * *